United States Patent
Willis

(10) Patent No.: US 8,348,762 B2
(45) Date of Patent: Jan. 8, 2013

(54) METHOD AND SYSTEM FOR ENHANCING VIDEO GAMES AND VIDEO GAME SYSTEMS

(75) Inventor: Daniel Willis, Stittsville (CA)

(73) Assignee: Google Inc., Mountain View, CA (US)

(*) Notice: Subject to any disclaimer, the term of this patent is extended or adjusted under 35 U.S.C. 154(b) by 1397 days.

(21) Appl. No.: 11/434,860

(22) Filed: May 17, 2006

(65) Prior Publication Data

US 2006/0287105 A1   Dec. 21, 2006

Related U.S. Application Data

(60) Provisional application No. 60/681,477, filed on May 17, 2005.

(51) Int. Cl.
*A63F 9/24* (2006.01)
(52) U.S. Cl. ........................ 463/42; 705/14.41
(58) Field of Classification Search .............. 705/14.41; 463/42
See application file for complete search history.

(56) References Cited

U.S. PATENT DOCUMENTS

| | | | |
|---|---|---|---|
| 5,768,382 A | 6/1998 | Schneier et al. | |
| 5,946,664 A * | 8/1999 | Ebisawa | 705/14.5 |
| 6,036,601 A | 3/2000 | Heckel | |
| 6,430,301 B1 | 8/2002 | Petrovic | |
| 6,442,259 B2 | 8/2002 | Culli et al. | |
| 6,616,533 B1 | 9/2003 | Rashkovskiy | |
| 6,640,336 B1 | 10/2003 | Ebisawa | |
| 6,704,415 B1 | 3/2004 | Katayama et al. | |
| 6,882,978 B2 | 4/2005 | Ebisawa | |
| 6,928,414 B1 | 8/2005 | Kim | |
| 6,996,413 B2 | 2/2006 | Inselberg | |
| 7,085,733 B2 | 8/2006 | Ebisawa | |
| 7,249,383 B1 | 7/2007 | McCully et al. | |
| 7,452,278 B2 | 11/2008 | Chen et al. | |
| 7,594,189 B1 * | 9/2009 | Walker et al. | 715/811 |
| 2001/0010059 A1 | 7/2001 | Burman et al. | |
| 2002/0059148 A1 | 5/2002 | Rosenhaft et al. | |
| 2002/0072413 A1 | 6/2002 | Arias et al. | |
| 2002/0082910 A1 | 6/2002 | Kontogouris | |
| 2002/0116263 A1 | 8/2002 | Gouge | |

(Continued)

FOREIGN PATENT DOCUMENTS

EP   1113639   7/2001

(Continued)

OTHER PUBLICATIONS

High, Kamau. "Jonathan Epstein, Game On." Nov. 19, 2007, Adweek [online] [retrieved on Jan. 2, 2008]. Retrieved from the Internet <URL: http://www.adweek.com/aw/magazine/article_display.jsp?vnu_content_id=1003674403>.

(Continued)

*Primary Examiner* — Corbett B Coburn
(74) *Attorney, Agent, or Firm* — Fish & Richardson P.C.

(57) ABSTRACT

A system making use of video games and data communications external to video games is used to provide advertisements, prizes and other benefits to gamers. The prizes relate to either of real world products and services as well as content for use within the video game environment. During a video game session an advertisement is provided to the gamer. When the gamer interacts with the advertisement the video game software acts to facilitate a transaction between the gamer and the advertiser.

44 Claims, 10 Drawing Sheets

U.S. PATENT DOCUMENTS

| | | | |
|---|---|---|---|
| 2003/0177187 A1 | 9/2003 | Levine et al. | |
| 2004/0015608 A1 | 1/2004 | Ellis et al. | |
| 2004/0043806 A1 | 3/2004 | Kirby et al. | |
| 2004/0073909 A1 | 4/2004 | Arimilli et al. | |
| 2004/0116183 A1 | 6/2004 | Prindle | |
| 2004/0128364 A1 | 7/2004 | Clark | |
| 2004/0143852 A1 | 7/2004 | Meyers | |
| 2004/0148221 A1* | 7/2004 | Chu | 705/14 |
| 2004/0221178 A1 | 11/2004 | Aaron et al. | |
| 2005/0098955 A1 | 5/2005 | Rasmussen | |
| 2005/0137015 A1 | 6/2005 | Rogers et al. | |
| 2005/0255923 A1 | 11/2005 | Aoki | |
| 2007/0043616 A1 | 2/2007 | Kutaragi et al. | |
| 2008/0102947 A1 | 5/2008 | Hays et al. | |

FOREIGN PATENT DOCUMENTS

| | | |
|---|---|---|
| GB | 2363219 | 12/2001 |
| JP | 2001-136583 | 5/2001 |
| WO | WO 01/88803 | 11/2001 |

OTHER PUBLICATIONS

European Patent Office Search Report for European Application No. 06741513.3, dated Aug. 6, 2009, 9 pages.

International Search Report for PCT/CA2006/000801, dated Aug. 30, 2006, 17 pages.

International Preliminary Report on Patentability for PCT/CA2006/000801, dated Nov. 19, 2007, 11 pages.

Nelson, M., Advertisers Got Game: Examining Effectiveness of Product Placements in New Media. AEJMC Archives, Sep. 2001.

Australian Patent Office, Patent Application 2006246938, dated Sep. 15, 2010, 2 pages.

Andreas, Ruf, Authorized Officer, European Patent Office, Supplementary European Search Report from EP Patent Application 06741513.3, dated Aug. 13, 2009, 9 pages.

English translation of Chinese Office Action from Chinese Patent Application No. 200680026056.8, dated Dec. 27, 2010, 7 pages.

Israel Office Action (with English translation) from Israeli Patent Application No. 187397 dated Dec. 22, 2010, 4 pages.

Japanese non-final office action (with English translation) mailed Jan. 1, 2012 from Japan Patent Office for JP Application No. 2008-511518, 9 pages.

Australian Examination reported dated May 14, 2012 from AU Patent Application No. 2006246938, 2 pages.

Israel Office Action (with English translation) from Israeli Patent Application No. 187397 dated May 28, 2012, 4 pages.

International Preliminary Report on Patentability from International Application No. PCT/CA2006/000801, mailed Nov. 29, 2007, 11 pages.

* cited by examiner

METHOD AND SYSTEM FOR ENHANCING VIDEO GAMES AND VIDEO GAME SYSTEMS

FIELD OF THE INVENTION

The invention relates to video games and more particularly to services provided to users of video games.

BACKGROUND

During recent years, computer gaming has gained increasing popularity, and today thousands of players are playing on-line games all around the world. Predictably, interactive computer gaming played on on-line enabled platforms has blurred the line between games and other entertainment or communication media, and the avenues that are being explored in the development of gaming might well break new ground for interactive Internet applications in all areas of business relations and social life.

Due to their dynamic nature and specific appeal to certain audiences, computer games and especially games played on Internet enabled platforms provide the ideal vehicle for Internet advertising. Not only is it possible for an advertiser to target directly a specific group of customers, but optionally advertisements are incorporated directly into the computer game, enabling something akin to the well-known concept of product placement. It would be advantageous to have at hand a method and system for effectively combining the two concepts elucidated above, and thus building a bridge from the advertising world to the world of computer gaming.

However, an advertising enabled game suffers from a complexity that is not seen in most other advertising venues. Often, one or more ads are scattered across a virtual game world, and presentation of the ads depends on game play progression. Furthermore, some spots for displaying ads are adjacent to buildings or objects or other spots, all of which contribute to a given spot being more or less appealing than other spots. Additionally, games optionally support multimedia spots.

There are many types of advertisements including product placements, interstitial advertisements, free product giveaways, contests, promotions, coupons, and other innovative ways to spread an advertisement. Unfortunately, heretofore only product placements and banner advertisements within video games have been explored. This stems from the very technology on which video games are founded.

Early advertising on the Internet usually took the form of banner advertisements diaplayed on web sites. A cost of these advertisements was based on a number of times each page including a known advertisement was uploaded to an end-user system for display. For example, each time the web site is uploaded money accrues to the owner of the web site. The advertiser paid a service provider for delivery of the banner advertisement and the service provider then paid the web site owner at intervals. Unfortunately, this model was heavily abused, for example by providing a system with an automated routine to reload a web site with a banner advertisement, repeatedly.

It is now more common to provide banner advertisements that only result in revenue to the owner of a web site in response to an acquisition—a user clicks on the banner. In this way, the revenue model for a banner advertisement involves a level of user interaction with the banner that is verifiable. Further, a system within a same physical location accessing a web site is typically limited within a predetermined period of time to generating accrued revenue only once—for example daily. This limits many forms of abuse. A person of skill in the art will appreciate that when a specific advertisement is provided in a video game, absent a verifiable interaction of a gamer with the advertisement, it is unclear if the gamer has noticed the advertisement. For example, if a static advertisement is provided to a gamer while game software is being loaded it is difficult to speculate let alone determine how effective the advertisement is simply because the gamer does not acknowledge viewing the advertisement.

In the context of video game advertising, it would be highly beneficial to support several advertising models. However, for many action type video games, it is not reasonable to expect a user of a video game to divert their attention from the video game in order to respond to an advertisement. Unfortunately, with the additional complexity of advertisement placement comes an additional complexity in reporting of impressions. What forms an impression is greatly complicated because game play affects angle of view, visibility, length of time in which an impression is provided, and repetition of impressions. Though in the world of Internet advertising, impression quality measures are obviated by reporting acquisitions in the form of "click throughs" instead of impressions, for video games, acquisitions are difficult to measure.

It would be beneficial to provide additional features within video games that enhance the business case for developing the games while enhancing an experience of a user.

SUMMARY OF THE INVENTION

In accordance with the invention there is provided a method comprising: transmitting a first electronic message from a first party to a second party, the first party including a gamer; and, transmitting a second electronic message from a system and in response to the first electronic message, the second electronic message provided for a benefit to the gamer, wherein at least one of the first electronic message and the second electronic message is provided at least to and from other than a video game in execution and wherein the other of the at least one of the first electronic message and the second electronic message is provided based on at least information provided from the video game in execution, the second electronic message other than relating to technical support for the video game.

In accordance with another embodiment of the invention there is provided a method comprising: providing a video game system; providing instruction data for when executed resulting in execution of a video game; executing the instruction data; and, impressing upon a gamer interfacing with the video game an impression within the video game and within a field of view of the video game environment during normal execution thereof, the impression comprising a code indicative of an address for contacting a remote system via other than the video game, the impressed code varying over the life of the video game.

In accordance with another embodiment of the invention there is provided a method comprising: providing real world data, the real world data relating to real world events; providing within a video game, an interface for receiving the real world data; providing the real world data to the video game in execution thereof; using the real world data to affect events and video game play based on the real world events; and providing a video game experience encompassing events analogous to the real world events, the video game experience varying with a variation of the real world events.

In accordance with another embodiment of the invention there is provided a method comprising: providing a video game system associated with a gamer; providing a communications device other than the video game system; providing instruction data for when executed resulting in execution of a video game; initiating a video game session on the video game system by executing the instruction data; overcoming a predetermined objective within a virtual environment of the video game session; and, receiving data with the communications device in response to overcoming the predetermined objective.

In accordance with another embodiment of the invention there is provided a 300. A method of communication comprising: providing a server; providing a video game system for having a video game executed thereon, the video game system supporting communication with a first network; during execution of the video game, transmitting from the server to the video game system address data for being impressed upon a user of the video game system during video game execution, the data for use in electronic communication via other than the video game; and, impressing upon the user of the video game system the address code from within an environment of the video game, the data other than relating to technical support of the video game.

An embodiment of the invention teaches a storage medium having instruction data encoded thereon, the instruction data for when executed by a suitable processing device supporting: executing a video game; and, impressing upon a gamer interfacing with the video game an impression within the video game and within a field of view of a video game environment during normal execution thereof, the impression comprising a code indicative of an address for contacting a remote system via other than the video game, the impressed code varying over the life of the video game.

BRIEF DESCRIPTION OF THE DRAWINGS

The invention is now described with reference to the drawings in which.

DETAILED DESCRIPTION OF EMBODIMENTS OF THE INVENTION

Figure 1:
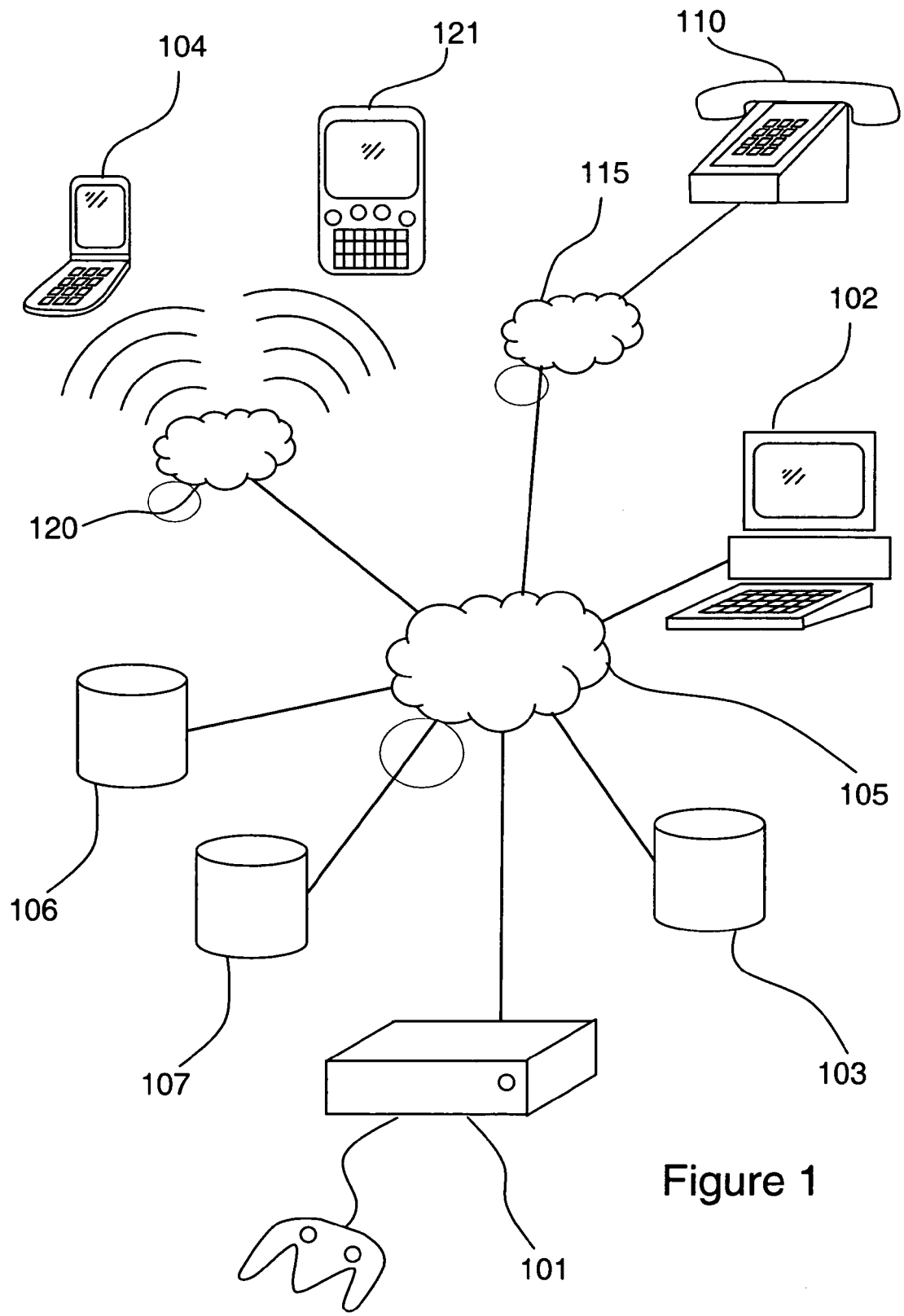
FIG. 1 is a simplified block diagram of a system for use in implementing and describing embodiments of the invention.

In order to enhance game play, it has been suggested to provide some aspects of a game within the video game itself, and other aspects of the game outside of the video game. A previous video game was released that, using communication hardware of a computer, communicated with external systems to contact a user of the video game. Because the external contact was at times unwelcome, such as receiving a fax message in the middle of the night, mass adoption of the video game concept employing aspects outside of the video game failed. Conversely, it is well known to support multiplayer video game play by having one or more systems communicating with each other during video game play. This is typically achieved either through peer-to-peer communication or via a server. Common examples of this communication include massively multiplayer online games (MMOG), multiplayer video games for XBOX LIVE®, and multiplayer games for playing with interconnected consoles, networked personal computers, or via infrared communication ports of a video game system.

A common business approach to supporting a server-based communication model such as XBOX LIVE® or MMOG is a paid model wherein each gaming system is registered for accessing the server and wherein a monthly fee is charged to each registered user. These fees offset the cost of operating the server, of communication to and from the server, and when successful result in profit. When unsuccessful, the costs are borne by the server provider resulting in significant costs at launch. Further for each independent server, a separate registration process and monthly fee is required. Alternatively for systems supported by a single server, restrictions are set out by the server operator, thereby limiting producer ability to generate further revenue through online services.

According to some embodiments of the invention, an aspect of the video game is useful in activities beyond a scope of the video game and/or an aspect of activities beyond the scope of the video game is useful within the video game. Some non-limiting examples of activities beyond a scope of a video game and an interface between the video game and the activities are described hereinbelow.

The term "user of a video game" and "gamer" are used interchangeably herein, the term gamer referring to a user of a video game or one who plays video games.

The term "teaser" is used herein and in the claims that follow to refer to information intended to encourage a gamer to play or to acquire a video game. For example, a teaser includes one or more of images of scenes from the video game, playable levels of the video game, video clips of levels within the video game, video clips advertising the video game, and interviews with creators of the video game The term "asset" is used herein and in the claims that follow to refer to something of play value in a video game including virtual objects, such as swords, weapons, spells, cars, tools, food, money, and so forth; virtual qualities such as health, life, strength, and so forth, and virtual skills such as a flying ability, improved accuracy and so forth.

The term "tournament" is used herein and in the claims that follow to refer to a video game tournament wherein there is a predetermined goal and a plurality of players play to achieve a same goal wherein a known number of players or of teams of players is expected to win the tournament.

The term "financial incentive" is used herein and in the claims that follow to refer to a benefit provided that results in some financial gain or reduced financial cost to a gamer.

The term "promotion" is used herein and in the claims that follow to refer to an offer of a discount, something for free, something in advance of its release, and so forth as it is commonly used in the promotional advertising field.

Referring to FIG. 1, a simplified block diagram of a system is shown. The system includes a video game console 101, a personal computer 102, and a server 103 coupled to a broadband communication medium 105 in the form of the Internet for supporting communication therebetween. Further, a plurality of other communication systems are shown coupled to the broadband communication network 105 including generic servers 106 and 107. Within the same diagram is shown a telephone 110 for communication and supporting voice communication via a public switching network 115. Though in practice many telephones exist at disparate locations, only one is shown to simplify the diagram. Wireless access network in the form of digital wireless communication network 120 is shown having wireless communication systems 121 coupled thereto for communication. Examples of wireless communication systems 121 include mobile phones, mobile personal digital assistants (PDAs), mobile computers, pagers, and mobile text message devices. Also shown is SMS communication device 104 in the form of a cellular telephone in communication with a wireless communication network 120.

Figure 2:
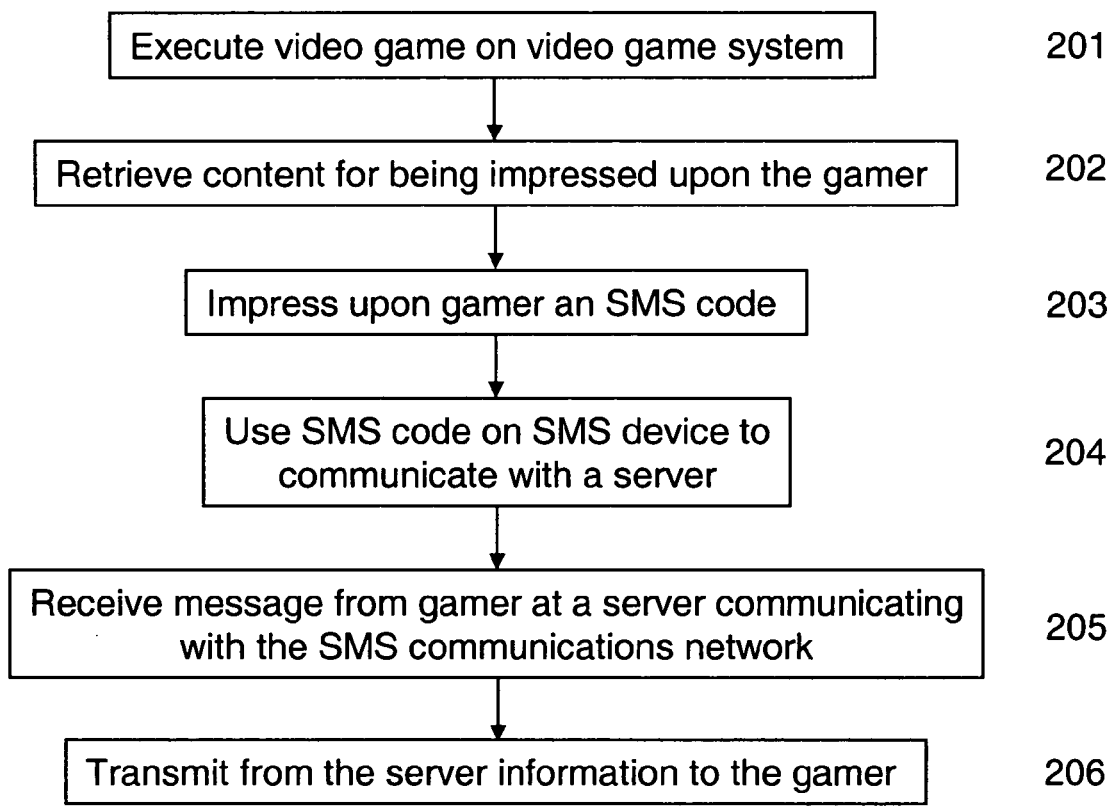
FIG. 2 is a simplified flow diagram of a method of communicating using short message service (SMS) codes provided within a video game environment.

Referring to FIG. 2, a simplified flow diagram of a method according to an embodiment of the invention is shown. A video game is executed at 201 on a video game system in the form of a personal computer 102. At 202, within the video game during execution thereof content for impressing upon a gamer is provided in the form of a message comprising an address in the form of an SMS message address. The content is impressed upon a user in execution of a video game at 203. The video game system is in communication with computer communication network 105. The SMS message address is for use on a network other than the computer communication network 105 such as the wireless communication network 120 and for being communicated by other than the video game system 102.

At 204, the gamer uses the SMS message address and SMS device 104 to transmit an electronic message to the SMS message address via the SMS device 104 and the wireless network 120. Once received at step 205, the SMS message is replied to at step 206 with data or information that is intended for the user. Preferable, the information or data is of value to the user in order to encourage the user to transmit a message to the SMS address.

Alternatively, the address comprises at least one of a telephone number for use in communicating via public switching network 115, a web site URL for use in communication through the broadband network 105, an email address for use in communication through the broadband network 105, and a pager address for use in communication via the public switching network 115. Further alternatively, the address comprises first data for use in one of addressing the message and formulating the message. For example, the address optionally includes data for use in identifying the gamer, a location within the game, a specific game, a specific impression, for identifying content for provision, or a message content to be included within any message transmitted by the gamer.

Figure 3:
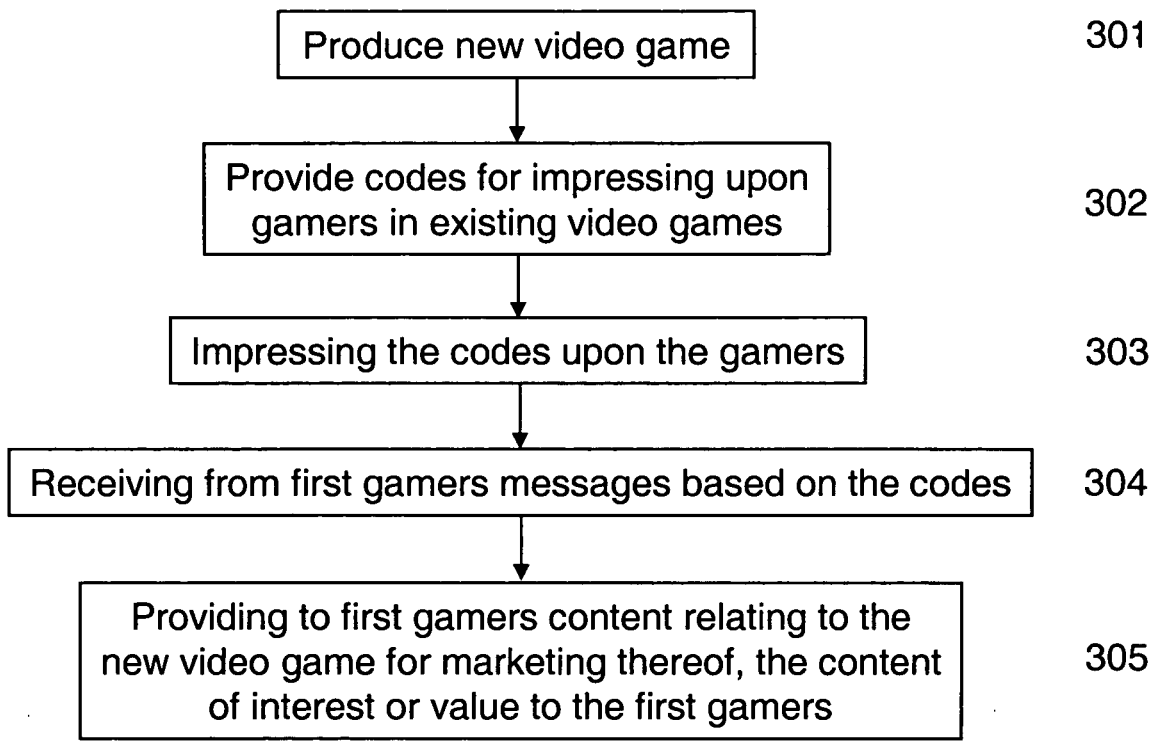
FIG. 3 is a simplified flow diagram of a method of publicizing new games.

Referring to FIG. 3, a new video game is produced for release at 301. The video game producer seeks to build awareness and momentum for the soon to be released title. To this end, marketing is engaged for advertising campaigns, press releases, and, in general, to increase customer awareness. A plurality of teasers for the upcoming title are deliverable to a user of a video game system. A code is provided for impressing upon a gamer at 302. While a user is playing a video game, for example a vide game for which a sequel is soon to be released, the user is shown a code in the form of an SMS address at 303. The user then uses the SMS address to transmit a message to the SMS address, the message including an email address. The server at the SMS address receives the message at 304 and at 305 transmits content in the form of a background image for use with a personal computer and relating to the sequel to the email address. Thus the user gets a cool background and the producer builds awareness and publicizes the sequel. The background image is preferably designed to be enticing visually and to encourage the user to purchase the sequel. Thus, the video game has encouraged the user to engage in a real world activity based on something displayed within the video game.

Alternatively, the user transmits an SMS message to the SMS address and receives, in reply, a URL from which to download the background image. In this case, the user experience is likely less convenient, but the user potentially passes the URL onto other people for further disseminating the producer's message. Of note, it is possible to accurately measure acquisitions since a number of users downloading the background image is known. Advantageously, new background images are offered at intervals leading up to a release of the sequel in order to build momentum and increase anticipation of the sequel's release. Further alternatively, teaser material such as playable levels, video demonstrations, clips, and other video game related material are made available based on data provided to users from within other video games. In this way, a user is encouraged to engage in a real world event—the SMS message—in response to playing of the video game.

Further alternatively, upon transmitting a message to the SMS address, the user is provided with access to other promotional information such as a coupon, information about the sequel, data about accessing information about the sequel, a teaser for the sequel, and so forth.

Alternatively, upon transmitting a message to the SMS address, the user is provided with a form or an address of a form for ordering or for pre-ordering of the sequel. Thus, a video game company uses earlier released and possibly related video games to distribute sequels and other related video game products, video games, and video game hardware.

Though the above noted embodiment refers to game related data retrieval, the data optionally relates to something completely unrelated to the video game. For example, when the SMS message is transmitted, the server replies with an electronic coupon. A user redeems the electronic coupon in a conventional fashion. Optionally, redeeming of the coupon results in some benefit to the user within the video game. As a simple example, a promotion is offered with a discount for purchasing a burger. When the user redeems the coupon and purchases the burger, a code is provided for provision within the video game allowing access to additional features in the form of further levels, improved tools, enhanced play, and/or other desirable video game rewards. For example, a user is provided with an additional sword.

In another embodiment, the data provided to the user is in the form of helpful information to benefit the user during game play. For example, at difficult points in a video game or at points in the video game where the user simply is unable to advance after more than a reasonable delay, an address is displayed for accessing help relating to the video game, and preferably, to that specific portion of the video game. By using the provided address, the user accesses, either directly or via a return message content desirable to the user in a current context of progress within the video game.

Advantageously, a use of another network is monetisable separately from the video game itself, either through separate advertising revenue, promotion revenue, or through direct invoicing as is the case for SMS messaging. Optionally, a third party associated with one of the user and the video game provider is invoiced. Metrics are collected by monitoring use of the provided addresses, for example SMS codes, to measure acquisitions. Specifically, since the user is establishing data communication outside the context of the game, it is clear that the game content has been successfully provided to the user and that the user is making use of that content. Of course, the present embodiment obviates a need to register a copy of a video game to identify a user thereof, since user identification is provided on the alternative network.

Alternatively, when video game system identification is known or establishable, a user, through the alternative communication network, optionally identifies the video game system. Upon receiving an indication of the video game system identifier, the server transmits data or additional content directly to the video game system. Even in such a case, monetising of the transaction is supported via the alternative network. Further, the method also supports the use of promotions to receive a code for use prior to receiving the data or additional content. Thus, a use of the method of the present embodiment supports promotions.

Alternatively, a short messaging system service (SMS) compatible code is embedded within an advertisement and impressed upon a user of a video game when the advertisement is impressed thereon. As such, the advertisement is monetisable based on impressions and then further monetisable based on acquisitions. This provides a dual mechanism for establishing advertisement value to an advertiser.

Figure 4A:
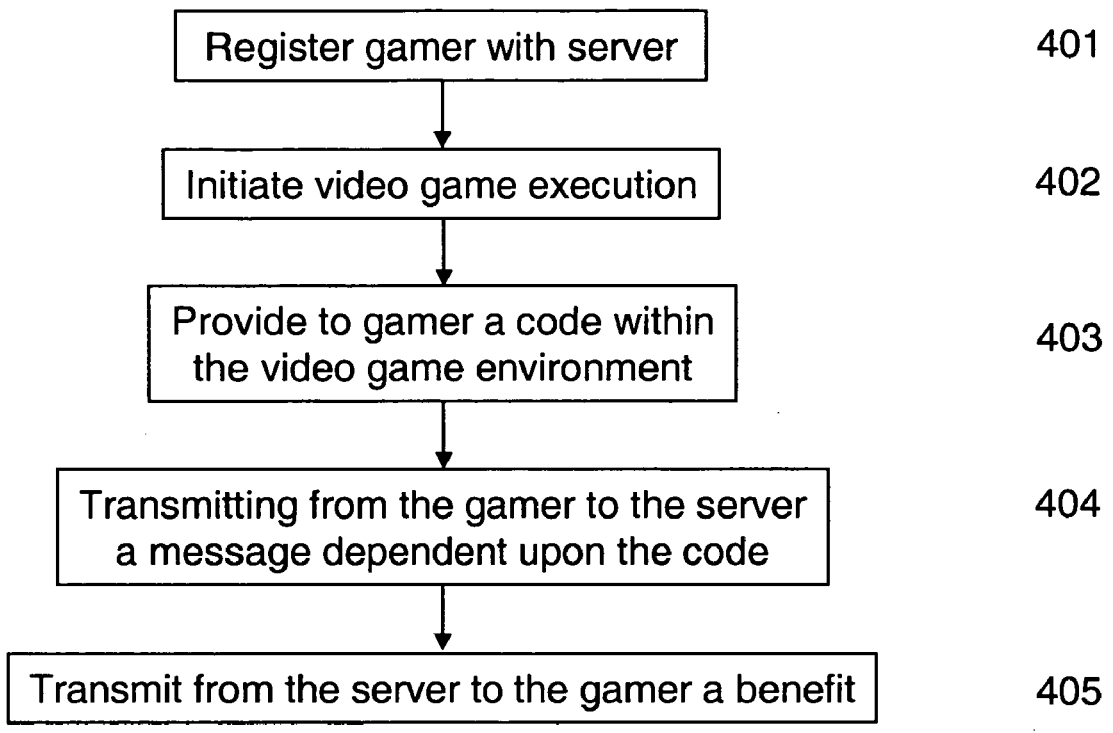
FIG. 4a is a flow diagram of an embodiment of the invention in which an SMS code is provided to an electronic address associated with a gamer in response to a gamer input signal provided during a video game session.

Referring to FIG. 4a, a simplified flow diagram of a method according to another embodiment of the invention is shown. At 401 gamer registers an address in the form of an address of the SMS compatible device 104 with server 106. During this registration process, the gamer provides data supporting transmission of information to the gamer by other than return communications, for example by email. At 402, the gamer initiates a video game session on computing device 102. The computing device 102 establishes communications with a server via a broadband communication network 105 in the form of the Internet. At 403 and during the gaming session an address in the form of an SMS address is provided to the gamer from the server and via the network 105, optionally along with an indication of a benefit associated with accessing the SMS address. The gamer provides the SMS address to the SMS compatible device 104 at 404 and transmits a message to the server; in reply, the server transmits to the gamer via the contact information provided at registration a benefit at 405. For example, the benefit includes images, hints, teaser levels, biographies, and alternative information.

When the user transmits the SMS message, the user is invoiced in accordance with an SMS plan and, as such, the user pays for the communication. Alternatively, SMS communication forms part of an overall communication package and a user is not billed for each SMS message individually. In either case, the SMS message relates to a fee attributable directly to the gamer or within a communication package of the gamer and is therefore monetisable.

In the case where payment is provided, a portion of the payment is optionally returned to the provider of the benefit. For example, a driving video game provides a splash screen with an offer to provide access to an official exotic car company screen saver via an SMS address. A gamer, interested in obtaining the screensaver provides, for example, an email address via their SMS compatible device to the SMS address. In response, an email is sent to the email address, the email comprising a URL and an authorization code for accessing the screensaver. The gamer visits the world wide web site corresponding to the provided link, provides the authorization code and downloads the screensaver. Since the gamer is paying for the SMS messaging, this cost offsets costs associated with downloading the screensaver. Further, the creator of the screensaver has an incentive to ensure that it is of good quality. Of course, the world wide web site optionally includes advertising or other promotional data for being impressed upon the gamer. Additionally, the creator of the screensaver is optionally provided a portion of the SMS message fees incurred by the user. Alternatively, the screensaver is transmitted directly via email along with other information such as advertising information. With small modifications, other deliverables and other delivery networks are supported such as using a 1-900 phone number to receive game related hints, optionally with a brief advertising message or using a 1-900 phone number to receive an address for accessing hints, optionally with a advertising messages.

In another non-limiting example, a business in the form of a fast food restaurant offers a discount on product or service in the form of a food item when a customer provides a code displayed within a game or when a customer provides something received in response to accessing an address displayed within a game. For example, a coupon is transmitted to the gamer in response to a message transmitted to the address. Because the gamer has registered, the coupon is transmittable to a registered electronic address of the gamer indexable by the SMS address of the gamer.

Figure 4B:
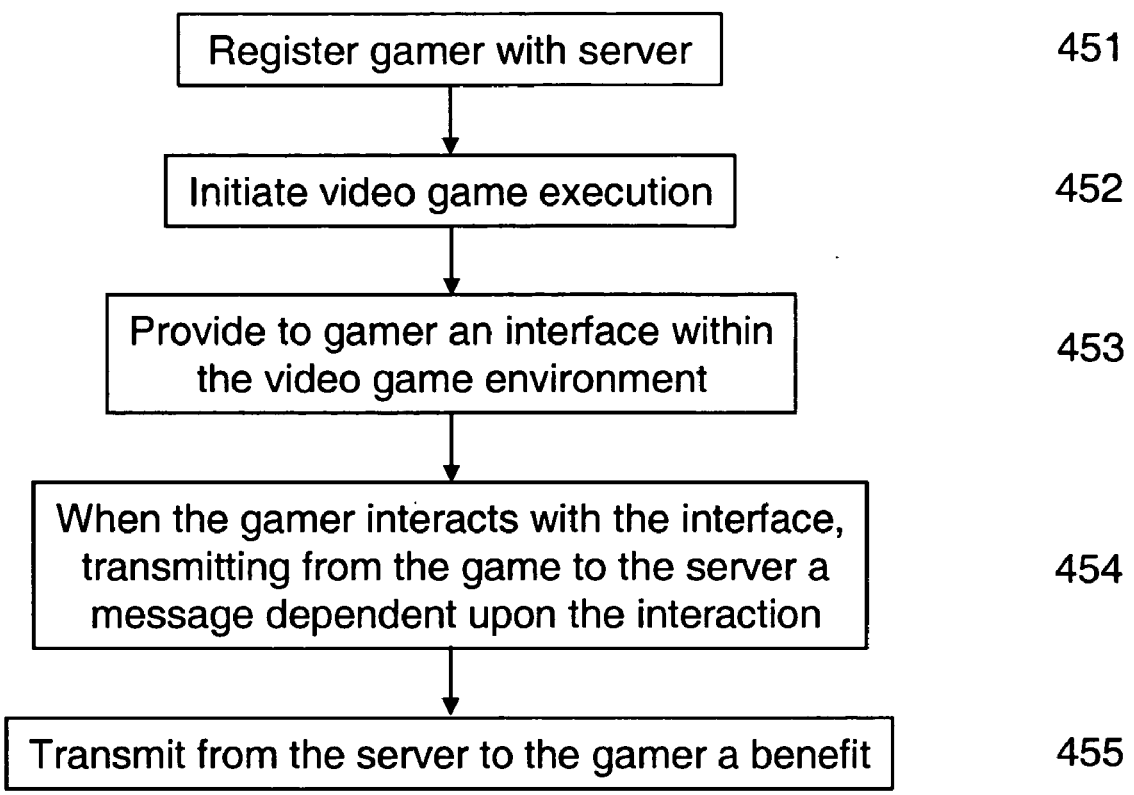
FIG. 4b is a flow diagram of another embodiment of the invention in which an SMS code is provided to an electronic address associated with a gamer in response to a gamer input signal provided during a video game session.

Referring to FIG. 4b, a simplified flow diagram is shown. Here, the gamer registers a video game and provides address data during the registration at 451. At 452, the gamer initiates a video game session on computing device 102. The computing device 102 establishes communications with a server via a broadband communication network 105 in the form of the Internet. During the video game session the gamer is provided with an icon comprising an advertisement at 453. A user who wishes to obtain benefits associated with the advertisement interacts with the advertisement in a predetermined fashion at, for example by moving a cursor to the icon and providing a suitable user input signal in the form of pressing a button. Alternatively, the user interaction includes interacting with an immersive three-dimensional object that is itself an advertisement in the form of a product placement. In response to the gamer action, a message is transmitted automatically at 454 by the video game to the server. In response at 455, a message is transmitted to the address provided during registration. For example, the message from the server comprises an SMS address. Optionally, the message also comprises information regarding the advertisement and a statement indicative of the origin of the message. Optionally, the gamer is provided an option to not interact with such advertisements by simply providing a predetermined input signal that disables the interaction, the response to an interaction, or by not registering. The resulting communication allows a video game having advertising content therein to further provide a user with additional data for further advertising, to measure acquisitions, to entice a user to a promotion, or for some other known purpose. Advantageously, the user action for engaging the process is performed within the video game and does not require any user interaction outside of the video game until the video game play session is completed.

For instance, in a video game session having a virtual billboard including a soft drink advertisement displayed therein, if a gamer has registered and opted in—authorized providing of interactive advertising content via an external network—then the advertisement additionally comprises an offer for a discount on the purchase of the soft drink. When the gamer moves their cursor over the advertisement and provides an input signal, a software process determines if such advertising is enabled and, assuming that it is, provides an electronic message to a server indicative of the advertisement and of the event—an acquisition. In response, an electronic transmission comprising a coupon for the soft drink is transmitted to a registered address of the gamer. If the gamer has not authorized interactive advertisements then no coupon is transmitted to the address of the gamer.

Optionally the video game supports dynamically downloading assets wherein an asset comprises an SMS address and, optionally a benefit associated with the SMS address. During a video game session new assets are downloaded from the server via the broadband network 105 to the computing device 102. In this way, new offers are optionally provided to the gamer during the video game session. Alternatively, a static content comprising an address is embedded within the game and the content provided in response thereto varies based upon downloaded data associated with the static address.

Optionally, transmission of a message to the address in the form of an SMS address provides a benefit to the gamer within the context of the video game itself. For example, a software company provides a software program having portions thereof only useable after an SMS address is accessed. Alternatively, a video game has a plurality of features and/or levels that are accessible through SMS messaging wherein an SMS message is transmitted in order to initiate an unlocking of video game features and/or levels in response thereto, the SMS address displayed within the video game. In this way, the software is optionally provided at a reduced cost to the video game purchaser with the additional cost borne when the gamer wishes to access more of the software features. By providing the software at a reduced cost, the gamer is more likely to acquire the software and evaluate it. Alternatively, new game assets are optionally provided to a gamer when they communicate with the SMS address.

Figure 5:
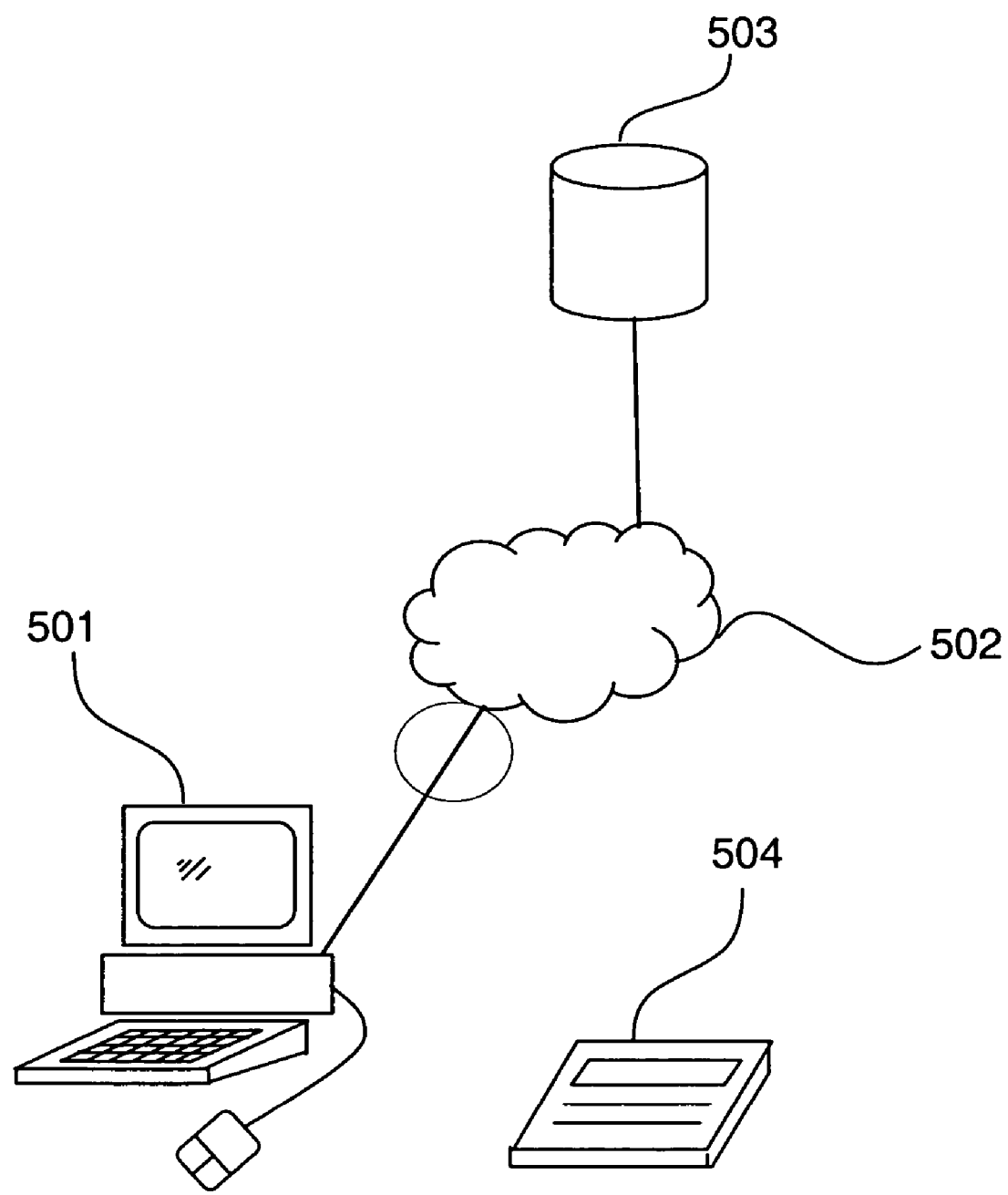
FIG. 5 is a simplified block diagram according to an embodiment of the invention supporting the use of a computing device used for supporting a video game session used as an SMS messaging device within a video game session.

Referring to FIG. 5, another simplified block diagram is shown. This embodiment features: a computing device 501 supporting a video game session, a broadband network 502 in the form of the Internet, a server 503, and an SMS compatible device 504. The gamer initiates a gaming session and registers the video game by providing an SMS address. The validity of the SMS address is verified. During a video game session the user is provided with an icon associated with an SMS address. A gamer who wishes to obtain benefits associated with the SMS address responds to the icon, for example by moving a cursor to the icon and providing a suitable user input signal, such as clicking on a mouse input button. In response to the gamer action, a SMS message is provided to the address associated with the gamer and the SMS account associated with the gamer is billed. Optionally, the SMS message is provided for a fee relating to delivery of the SMS message. Optionally, the message comprises the benefit. In this way, the gamer need not type an SMS code into their SMS compatible device to receive the benefit.

As video games have become more popular it is now the case that there are tournaments for video game players in which those gammers who defeat others in the video game environment receive prizes. Such tournaments are useful in promoting video games in general and specific titles of video games in specific. Therefore, tournaments represent a form of advertising. Winning a tournament provides the winning gamer a certain amount of notoriety among other garners in addition to any prizes associated with the tournament itself. Although video games are popular among a variety of different demographic groups they are very popular among competitive players.

Currently, when two people play a video game in a competitive context it is typical that the only record of the outcome is a win/loss statistic, although in many cases, even such a statistic is not stored. Some games support monitoring and storing within an archive data that is optionally used to replay a previous game session. Most of the video games that support this type of replay are designed for use on a personal computer. Similarly, it is beneficial for video game publishers to provide an additional incentive to the video game players to play frequently.

To this end, it is a complex and difficult task to organize video game tournaments, whether they are held in a single location or are conducted via a broadband communication medium with different players at different locations that are remote one from another. An organizer of a tournament must determine suitable players, suitable rules, suitable prizes and suitable forms of publication both with regards to publicity and with regards to results. All of this is typically performed outside the space of the video game. Further, the tournament, though a video game tournament, is typically managed like a sports tournament in one way or another. Typically, spectators are present to watch game play or are present at one or another tournament player location when a video game tournament is conducted remotely. It would be advantageous to link the out-of-game functions and the in-game-play, to better support multiplayer environments and challenges.

For example, during a MMOG, each gamer is represented by an avatar within a virtual environment. During play, when a second gamer wishes to contact a first gamer, text or verbal communication is initiated within the MMOG. The first gamer either responds or ignores the communication. Often, the first gamer is busy and chooses to not immediately respond to the second gamer due to ongoing events or interactions. Unfortunately, once the events are no longer pressing, the second gamer is sometimes no longer in the immediate vicinity of the first gamer. Thus, potential communications are lost and their content remains unknown. Advantageously, when a gamer fails to respond to an initial contact attempt, the second gamer is provided communications data to support communication with the first gamer at a later time. For example, the communication data comprises one of an SMS contact address and an email address of the first gamer. Preferably, the communication data is created by the MMOG server and has a very limited lifespan during which all communication messages transmitted thereto are forwarded to the first gamer.

Communication messages optionally comprises: an email message or an SMS message. Further optionally, the communication data comprises a URL. Alternatively, the second gamer is provided an SMS code that is used to provide certain information regarding the first gamer including data regarding a game history such as a win-loss record for the first gamer and contact information. In this way, the second gamer is able to review the credentials of the first gamer and decide if it would be desirable to challenge the first gamer to a match.

Thus, setting up a tournament is facilitated since communication with each player is supported within the video game environment or outside thereof to identify and invite gammers to the tournament. Further, the contact information is useful in setting up practice sessions, teams, groups for MMOG play, and so forth.

In accordance with another embodiment, a code is impressed from within a video game environment to invited gammers to allow them to access a tournament. For example, an SMS code is provided and by transmitting a message thereto, tournament information is provided including access codes. Players within the tournament then provide the access code in order to play.

Optionally, a match between the first gamer and second gamer involves the first and second gammers competing for a prize. Optionally, others are permitted to act as spectators on the match provided that they contribute to the match by providing a suitable SMS code. The prize is optionally contributed in a number of ways. For example, the gamers optionally agree to each provide a game asset to a virtual repository wherein the contents of the virtual repository are made available to the winner of the match. Alternatively, a sponsor of the match provides the prize. Further optionally, the prize is provided to the winner of the match by providing the winning gamer an SMS code that they use to obtain the prize. A person of skill in the art will appreciate a relatively large tournament is optionally treated as a set of matches with a variety of different prizes provided for achieving certain predetermined criteria.

Figure 6:
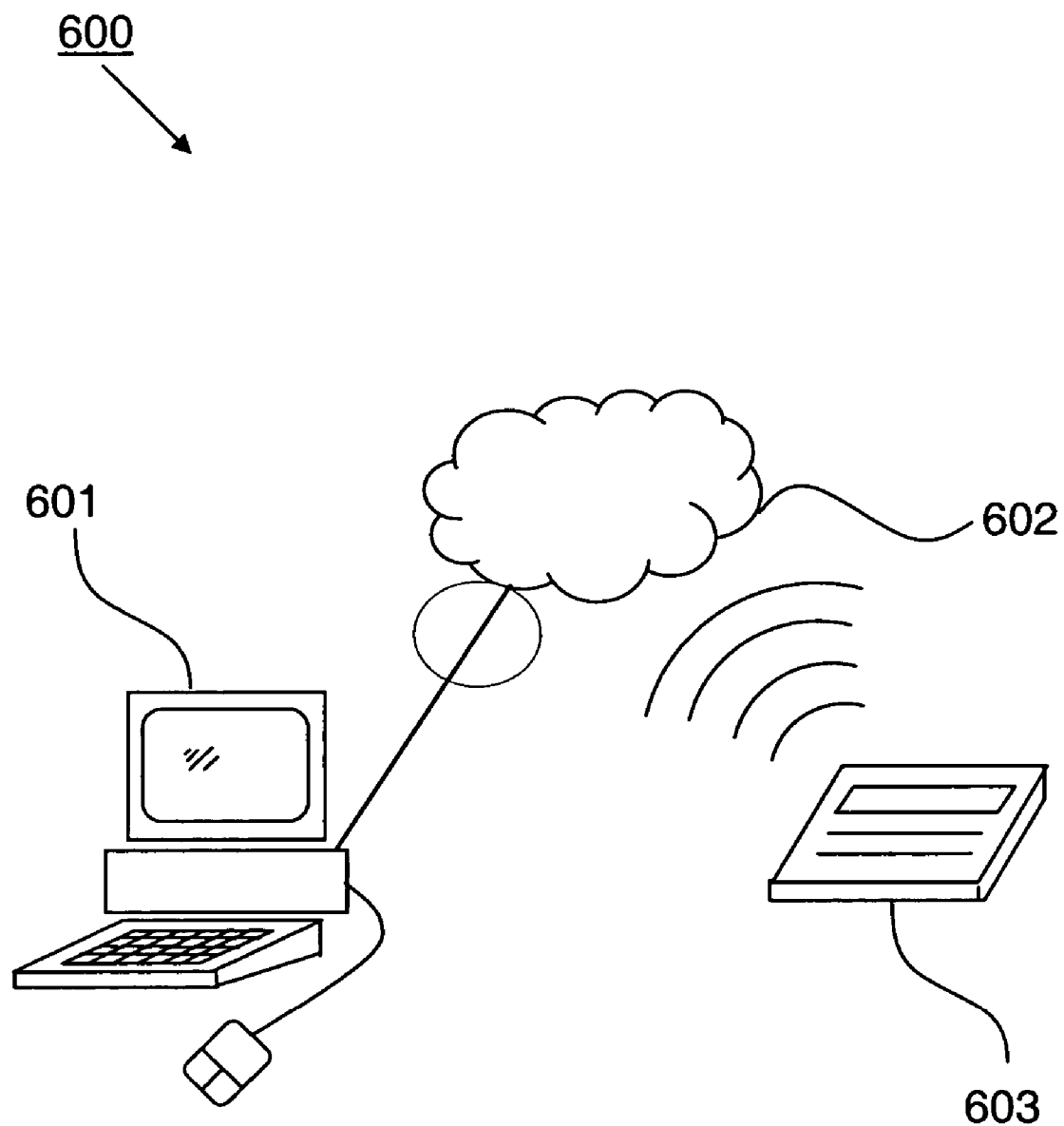
FIG. 6 is a simplified block diagram of according to an embodiment of the invention in which a benefit is provided to a user in response to the user completing a predetermined task within a video game session.

Referring to FIG. 6 a simplified block diagram of a system is shown. The system 600 comprises: a computing device 601 supporting a video game, a public network 602 supporting broadband communication, and a communications device 603. The computing device 601 and the communication device 603 both support a data connection with the public network 602. The computing device 601 is a personal computer in the instant example; however, other types of computing devices 601 such as gaming consoles are also supported by a variety of alternatives. In an alternative embodiment, the computing device 601 is a game console; while in another embodiment the computing device 601 is a portable gaming device. Other suitable computing devices include: computer based gambling systems and cellular telephones supporting video games. The instant embodiment of the invention supports a variety of types of communications devices 603. A first type of communications device 603 is a cellular telephone. Optionally, a suitably equipped personal computer is the communications device 603. It should be noted that the communications device 603 and the computing device 601 are distinct, despite the fact that they optionally comprise very similar hardware. A user of the computing device 601 is registered such that an electronic address of the computing device 601 and the communications device 603 are associated with the same user. The computing device 601 supports a video game environment that provides the user a variety of tasks to complete. When the user completes a specific task of the variety of tasks a message is provided to the communications device 603. A variety of messages are supported, for example:

1. Text messages such as: instructions to receive a coupon or instructions to find an Easter egg within the video game;
2. Static video data relating to the game, such as computer wallpaper having a specific theme relevant to the video game;
3. Data corresponding to a video stream, optionally the video stream showing a virtual recreation of a portion of the video game environment proximate the time when the specific task was accomplished;
4. An audio message; and/or
5. A ring tone for use with a programmable cellular telephone or text messaging pager.

Optionally, the communications device 603 while associated with the user is also associated with an acquaintance of the user. The acquaintance has provided the user information regarding a computing address of the communications device 603 belonging to the acquaintance. Thus, when the user completes a specific task within the video game the acquaintance is informed. In this way, if the acquaintance and the user both play a game that requires their gaming experiences to be consistent according to a set of rules in order to play together then the system according to the instant embodiment of the invention allows the acquaintance to be informed regarding what criteria the user has met. Thus, for example, if two friends are playing a same game but in different virtual environments and the first friend is instructed to accomplish a specific goal in order to play in virtual environment currently in use by the second friend then when the first friend is approved to participate in the virtual environment associated with the second friend, the second friend is informed via the communications device of the second friend. This helps to enhance the gaming experience by informing the users when they are able to play together. While the example above of the friends describes a situation in which the a first friend informs a second friend when the goal is met it will be apparent to one of skill in the art that an alternative embodiment of the invention supports a number of predetermined users being informed of the progress of the first friend. Optionally, in order to ensure that only desired messages are provided, both the first friend and the second friend consent to the described transfer of data in advance of any sending of the data.

Figure 7:
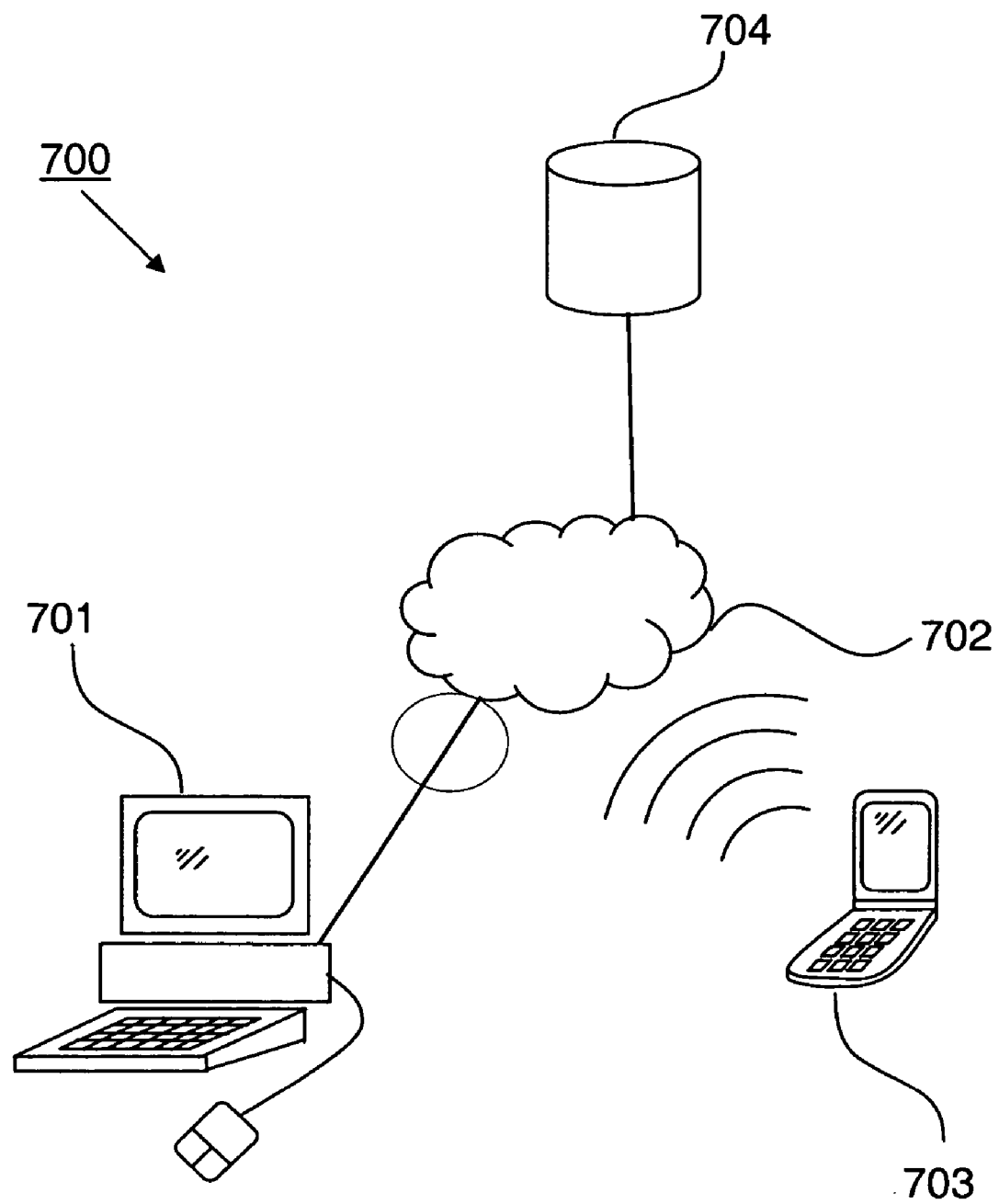
FIG. 7 is a simplified block diagram according to an embodiment of the invention in which a user, having achieved a predetermined objective in a video game is provided a benefit that is external to the video game.

Referring to FIG. 7, a system 700 according to another embodiment of the invention is provided. The system 700 comprises: a computing device 701, a public network 702 supporting broadband communication such as the Internet, a communications device 703 and a server 704. The communications device 703 supports a data port for supporting communications with the public network 702. The server 704 comprises a data port supporting communication with the public network 702. The server 704 is associated with the video game run on the computing device 701. A gamer using a specific game on the computing device 701 is registered to use the game. The registration process comprises the gamer providing an electronic mailing address. When a user achieves a specific goal in a gaming environment, the computing device 701 provides a message to the server 704 via the public network 702. The server 704 then provides an electronic mail message to the gamer via the public network. The message optionally comprises any of: a message of congratulations, coupon for other products associated with one of the game and the computing device 701, an offer to provide additional game play information to the server 704, new video game content, etc. In this way, a computer game developer is able to identify those users that have demonstrated a level of skill with their game and thereby offer the user the opportunity to, for example, act as a beta tester for another video game. Alternatively, the user is provided a message associated with an advertisement for a real product. For example, if the user should win a virtual automobile race while using a virtual automobile modeled to resemble a real automobile then the user is invited to a local car dealership to have their photo taken in a corresponding real automobile at a local dealership. Alternatively, the user is invited to take a test drive of the real vehicle.

Alternatively, the server 704 is contacted during a video game session in which the user is playing a specific game associated with the server 704. The video game supports downloadable asset content provided by the server 704. Thus, for example, the user purchases a car racing game supporting downloadable car assets. As a promotion for a new sports car a downloadable car asset having properties consistent with the new sports car or alternatively consistent with an advertisement for the new sports car is created. This asset is made available to the user within a virtual environment of the video game. In the event that the user should win a virtual automobile race using the downloaded asset then the server 704 is informed. The server 704 then provides a congratulations message to the gamer. The message comprises an invitation to visit a local automobile dealership to examine and optionally test drive the real version of the car. Further optionally, the asset content comprises information relating to contacting an asset server when the user provides predetermined user registration information. In this way, the asset and the related promotion are optionally not directly linked to the developer or publisher of the video game. Further optionally, the user supplies user registration information when the asset is provided in the video game. Clearly, a wide variety of benefits are optionally provided to the gamer via their electronic mail account. A person of skill in the art will appreciate that the message that is provided optionally comprises an Internet address and an authorization code that is useable a limited number of times.

Figure 8:
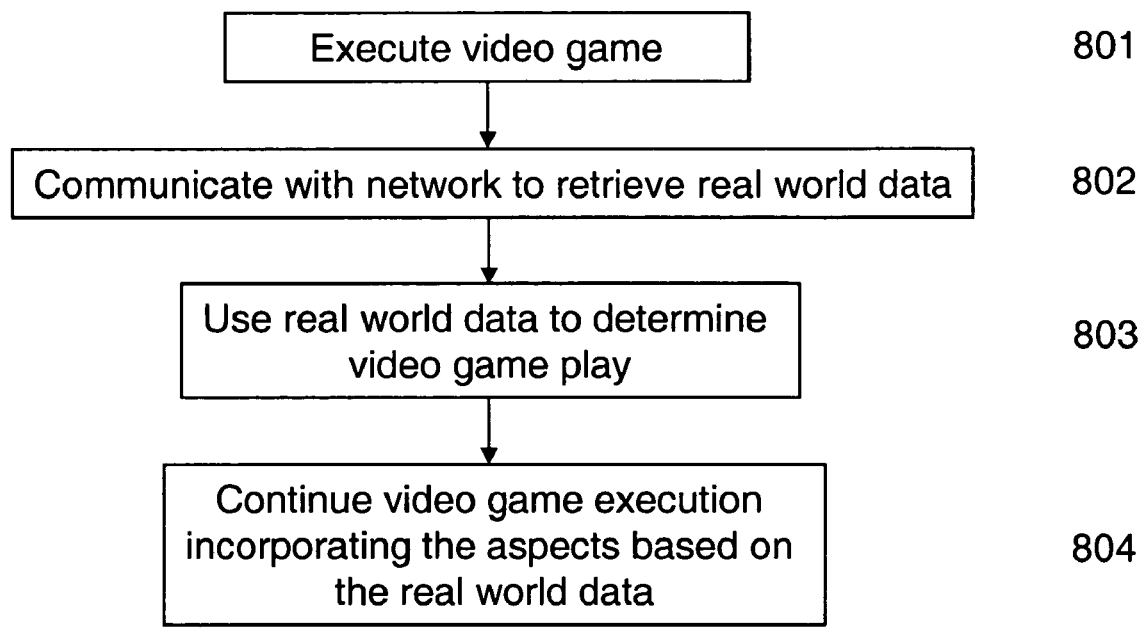
FIG. 8 is a simplified flow diagram of a method of retrieving and relying on real world data to affect aspects of video game play; and, FIG. 9 is a simplified flow diagram of a method of retrieving and relying on real world weather data to affect aspects of video game play.

Referring to FIG. 8, shown is a simplified flow diagram of a method of incorporating real world data into a video game for enhanced game play. At 801, a video game is executed. The video game during execution communicates with a network to retrieve real world data therefrom at 802. At 803, the video game uses the real world data in determining aspects of video game play. At 804, the video game execution continues incorporating those aspects of video game play based on the real world data.

Figure 9:
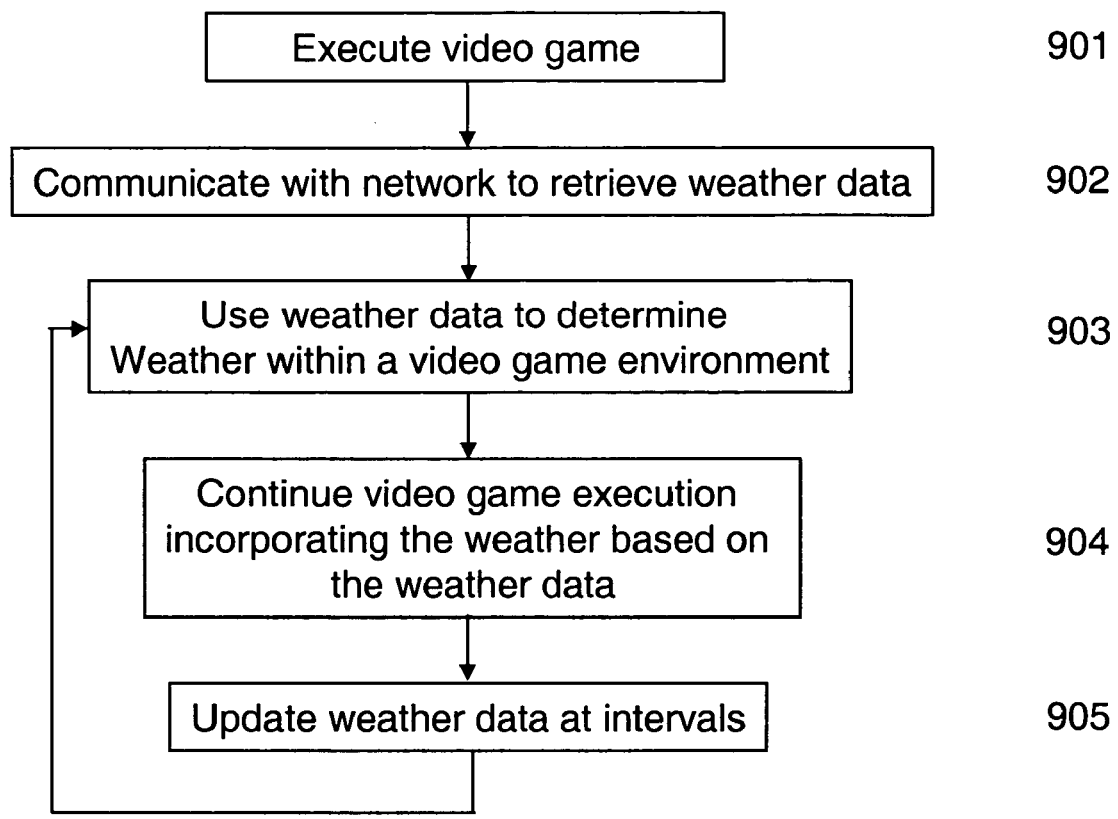

Referring to FIG. 9, a more specific example of a method of incorporating real world data into a video game for enhanced game play is shown in simplified flow diagram. At 901, a video game is executed. The video game during execution communicates with a network to retrieve real world data in the form of meteorological—weather—data, at 802. At 803, the video game uses the weather data in determining weather for the video game relating to the weather data. For example, rain in the weather data results in rain in the video game. At 804, the video game execution continues incorporating the weather based on the real world data. Thus, video game play is somewhat randomized by the very nature of continually evolving and changing real world data.

Alternatively, the real world data has an analogous aspect within the video game that appears unrelated. Changes in weather being reflective of changes in health or finances within the video game environment.

Typically, when weather data is used to affect weather within a video game environment, the weather data is related to a predetermined location. For larger video game environments, the weather data, when related to a larger geographical area, is mapped onto the virtual geography of the video game environment. For example, the northeast portion of the video game environment receives weather similar to that of New York state while the south west corner of the video game receives weather similar to that of California.

Of course, the real world data optionally includes any or all of geopolitical data, economic data, weather data, traffic data, astronomical data, news data, supply and demand data, and statistical data relating to one or more populations. Further, the real world data is useful in causing variations within the video game that are somewhat random in nature yet, at the same time, somewhat statistically bounded. For example, if the weather is used to vary a strength of characters within a region, that strength will vary with the seasons in a statistically predictable fashion but, on a daily basis in a less than predictable fashion. Conversely, real world data with a more random nature or with different cycle times is useful for affecting other game aspects.

As another example, one of astronomical and tidal data is useful for projecting outside lighting and water levels within a video game environment. When used, the location of the moon and of the sun are useful for a variety of effects within a video game.

Alternatively, real world data is converted into gaming environment data prior to affecting an aspect thereof. For example, real world economic data is transformed into game environment economic data, for example a cost of swords. Alternatively, the transform of real world data retains the immersive quality of the game—news is transformed in a predetermined fashion to reflect in game aspects, sports scores are transformed to reflect sports teams within the immersive environment, military group names are transformed to reflect military group names and nations within the video game environment, and so forth.

As is evident to those of skill in the art, the use of real world data obviates a need for a developer of a video game to program those variations or to create data for effecting those variations. Further, relying on real world data allows for video game variety to increase over a life of the video game such that, like real life, it remains fresh for the gamer. Further, as processor capabilities improve it is a straightforward matter to support aspects of video games that change with changing real world data.

Though the invention is described with reference to two separate communication systems, it will be readily understood that in some embodiments a computer system optionally acts as both communication systems under control of different software applications in execution thereon.

In accordance with an embodiment, the benefit or promotion allows a gamer to purchase products either relating to or other than relating to the video game from within or from outside of the video game. As such, a button within a video game allows a user to purchase a sequel thereto and to have the sequel sent to the gamer in a real world sense or, alternatively, transmitted electronically to the gamer. It is further envisioned that books, upgrades, toys, and accessories are also marketable to garners via a video game. Further, the method of promoting products for sale via a video game is also supported using, for example, address data displayed within the video game for ordering thereof using a separate communication channel other than one including the video game itself.

Numerous other embodiment of the invention will be apparent to one of skill in the art without departing from the spirit and the scope of the invention as described with reference to the embodiments of the invention. A person of skill in the art will appreciate that upon completing a financial transaction it is customary to provide a receipt. A person of skill in the art will clearly appreciate that providing an electronic receipt is easily accomplished by sending a conventional email message.

What is claimed is:

1. A non-transitory computer readable storage medium having instruction data, which, when executed by a processing device, causes the processing device to perform operations comprising:

generating a code associated with a video game in execution, the game accessed by a user, wherein generating the code comprises generating data that identifies a particular impression of an advertisement in the video game;

enabling the impression of the advertisement within the video game and within a field of view of a video game environment during game play of the video game by the user on a first system, the advertisement comprising advertising content and the code, the code indicative of an address for contacting a system remote from the first system through a communication link using an application separate from the video game, the code comprising data that when provided to the remote system identifies the video game accessed by the user; and in response to the code being received at the remote system through the communication link from a second system different from the first system on which the video game is executed and the advertisement is impressed, enhancing an aspect of game play in the video game and storing data identifying the impression identified by the generated data as a verified impression.

2. The storage medium of claim 1, wherein the code comprises a short message service (SMS) code.

3. The storage medium of claim 1, the operations further comprising:
establishing a data communication link between a download server and the first system executing the video game using a public network; and
prior to enabling the impression upon the user, providing data indicative of the code from the download server to the first system using the public network.

4. The storage medium of claim 1, the operations further comprising:
making metrics available for further processing and output, the metrics comprising the data identifying the impression as a verified impression.

5. The storage medium of claim 4, the operations further comprising:
storing data regarding acquisitions made by the user when the user uses the code to contact the remote system through the communication link that is separate from the video game; and
wherein the metrics comprise the data regarding the acquisitions made by the user.

6. The storage medium of claim 1, wherein enhancing an aspect of the video game comprises providing access to a further level of the video game.

7. The storage medium of claim 1, wherein the impressed code varies over the life of the video game.

8. The storage medium of claim 1, wherein enhancing an aspect of the video game comprises providing access to an asset for use within the video game.

9. A method comprising:
generating a code associated with a video game in execution, the game accessed by a user, wherein generating the code comprises generating data that identifies a particular impression of an advertisement in the video game;

enabling the impression of the advertisement within the video game and within a field of view of a video game environment during game play of the video game by the user on a first system, the advertisement comprising advertising content and the code, the code indicative of an address for contacting a system remote from the first system through a communication link using an application separate from the video game, the code comprising data that when provided to the remote system identifies the video game accessed by the user; and in response to the code being received at the remote system through the communication link from a second system different from the first system on which the video game is executed and the advertisement is impressed, enhancing an aspect of game play in the video game and storing data identifying the impression identified by the generated data as a verified impression.

10. The method of claim 9, wherein the code comprises a short message service (SMS) code.

11. The method of claim 9, further comprising:
establishing a data communication link between a download server and the video game using a public network; and
prior to enabling the impression upon the user, providing data indicative of the code from the download server to the video game using the public network.

12. The method of claim 5, further comprising:
associating a user of the video game with the code; and
in response to the code being received from the second system at the remote system, providing a communication to the user through an address provided in association with the user registering the video game.

13. The method of claim 5, further comprising:
billing an account associated with the user in response to the code being received at the remote system.

14. The method of claim 9, further comprising:
making metrics available for further processing and output, the metrics comprising the data identifying the impression as a verified impression.

15. The method of claim 14, further comprising:
storing data regarding acquisitions made by the user when the user uses the code to contact the remote system through the communication link that is separate from the video game; and
wherein the metrics comprise the data regarding the acquisitions made by the user.

16. The method of claim 9, wherein enhancing an aspect of the video game comprises providing access to a further level of the video game.

17. The method of claim 9, wherein enhancing an aspect of the video game comprises providing access to an asset for use within the video game.

18. A computer implemented method comprising:
providing a user access to a video game in execution;
obtaining a code associated with the video game accessed by the user, wherein obtaining the code comprises obtaining data identifying a particular impression of an advertisement in the video game;
enabling the impression of the advertisement within the video game and within a field of view of a video game environment during game play of the video game by the user on a first system, the advertisement comprising advertising content and the code, the code indicative of an address for contacting a system remote from the first system through a communication link using an application separate from the video game, the code comprising data that when provided to the remote system identifies the video game accessed by the user; and
in response to receiving an indication that the code was received at the remote system through the communication link from a second system different from the first system on which the video game is executed and the advertisement is impressed, enhancing an aspect of game play in the video game and storing data identifying the impression as a verified impression.

19. The method of claim 18, wherein the code comprises a short message service (SMS) code.

20. The method of claim 18, further comprising:
establishing, at the first system executing the video game, a data communication link with a download server using a public network; and
prior to enabling the impression upon the user, obtaining data indicative of the code from the download server using the public network.

21. The method of claim 18, wherein enhancing an aspect of the video game comprises providing access to a further level of the video game.

22. The method of claim 18, wherein the impressed code varies over the life of the video game.

23. The method of claim 18, wherein enhancing an aspect of the video game comprises providing access to an asset for use within the video game.

24. A non-transitory computer readable storage medium having instruction data, which, when executed by a processing device, causes the processing device to perform operations comprising:
providing a user access to a video game in execution;
obtaining a code associated with the video game accessed by the user, wherein obtaining the code comprises obtaining data identifying a particular impression of an advertisement in the video game;
enabling the impression of the advertisement within the video game and within a field of view of a video game environment during game play of the video game by the user on a first system, the advertisement comprising advertising content and the code, the code indicative of an address for contacting a system remote from the first system through a communication link using an application separate from the video game, the code comprising data that when provided to the remote system identifies the video game accessed by the user; and
in response to receiving an indication that the code was received at the remote system through the communication link from a second system different from the first system on which the video game is executed and the advertisement is impressed, enhancing an aspect of game play in the video game and storing data identifying the impression as a verified impression.

25. The storage medium of claim 24, wherein the code comprises a short message service (SMS) code.

26. The storage medium of claim 24, the operations further comprising:
establishing, at the first system executing the video game, a data communication link with a download server using a public network; and
prior to enabling the impression upon the user, obtaining data indicative of the code from the download server using the public network.

27. The storage medium of claim 24, wherein enhancing an aspect of the video game comprises providing access to a further level of the video game.

28. The storage medium of claim 24, wherein the impressed code varies over the life of the video game.

29. The storage medium of claim 24, wherein enhancing an aspect of the video game comprises providing access to an asset for use within the video game.

30. A system comprising one or more computers and one or more storage devices storing instructions that when executed by the one or more computer cause the one or more computers to perform operations comprising:
providing a user access to a video game in execution;
obtaining a code associated with the video game accessed by the user, wherein obtaining the code comprises obtaining data identifying a particular impression of an advertisement in the video game;
enabling the impression of the advertisement within the video game and within a field of view of a video game environment during game play of the video game by the user on a first system, the advertisement comprising advertising content and the code, the code indicative of an address for contacting a system remote from the first system through a communication link using an application separate from the video game, the code comprising data that when provided to the remote system identifies the video game accessed by the user; and
in response to receiving an indication that the code was received at the remote system through the communication link from a second system different from the first system on which the video game is executed and the advertisement is impressed, enhancing an aspect of game play in the video game and storing data identifying the impression as a verified impression.

31. The system of claim 30, wherein the code comprises a short message service (SMS) code.

32. The system of claim 30, the operations further comprising:
establishing, at the first system executing the video game, a data communication link with a download server using a public network; and
prior to enabling the impression upon the user, obtaining data indicative of the code from the download server using the public network.

33. The system of claim 30, wherein enhancing an aspect of the video game comprises providing access to a further level of the video.

34. The system of claim 30, wherein the impressed code varies over the life of the video game.

35. The system of claim 30, wherein enhancing an aspect of the video game comprises providing access to an asset for use within the video game.

36. A system comprising one or more computers and one or more storage devices storing instructions that when executed by the one or more computer cause the one or more computers to perform operations comprising:
generating a code associated with a video game in execution, the game accessed by a user, wherein generating the code comprises generating data that identifies a particular impression of an advertisement in the video game;
enabling the impression of the advertisement within the video game and within a field of view of a video game environment during game play of the video game by the user on a first system, the advertisement comprising advertising content and the code, the code indicative of an address for contacting a system remote from the first system through a communication link using an application separate from the video game, the code comprising data that when provided to the remote system identifies the video game accessed by the user; and
in response to the code being received at the remote system through the communication link from a second system different from the first system on which the video game is executed and the advertisement is impressed, enhancing an aspect of game play in the video game and storing data identifying the impression identified by the generated data as a verified impression.

37. The system of claim 36, wherein the code comprises a short message service (SMS) code.

38. The system of claim 36, the operations further comprising:

establishing a data communication link between a download server and the video game using a public network; and prior to enabling the impression upon the user, providing data indicative of the code from the download server to the video game using the public network.

39. The system of claim 36, the operations further comprising:

associating a user of the video game with the code; and in response to the code being received from the second system at the remote system, providing a communication to the user through an address provided in association with the user registering the video game.

40. The system of claim 36, the operations further comprising:

billing an account associated with the user in response to the code being received at the remote system.

41. The system of claim 36, the operations further comprising:

making metrics available for further processing and output, the metrics comprising the data identifying the impression as a verified impression.

42. The system of claim 41, the operations further comprising:

storing data regarding acquisitions made by the user when the user uses the code to contact the remote system through the communication link that is separate from the video game; and wherein the metrics comprise the data regarding the acquisitions made by the user.

43. The system of claim 36, wherein enhancing an aspect of the video game comprises providing access to a further level of the video game.

44. The system of claim 36, wherein enhancing an aspect of the video game comprises providing access to an asset for use within the video game.

* * * * *

UNITED STATES PATENT AND TRADEMARK OFFICE
CERTIFICATE OF CORRECTION

| | | |
|---|---|---|
| PATENT NO. | : 8,348,762 B2 | |
| APPLICATION NO. | : 11/434860 | |
| DATED | : January 8, 2013 | |
| INVENTOR(S) | : Daniel Willis | |

It is certified that error appears in the above-identified patent and that said Letters Patent is hereby corrected as shown below:

In the Claims:

Claim 12, Column 16, Line 17 – delete "claim 5" and insert -- claim 9 --, therefor.

Claim 13, Column 16, Line 23 – delete "claim 5" and insert -- claim 9 --, therefor.

Claim 33, Column 18, Line 32 – delete "video." and insert -- video game. --, therefor.

Signed and Sealed this
Thirtieth Day of April, 2013

Teresa Stanek Rea
*Acting Director of the United States Patent and Trademark Office*

UNITED STATES PATENT AND TRADEMARK OFFICE
CERTIFICATE OF CORRECTION

Page 1 of 1

| | |
|---|---|
| PATENT NO. | : 8,348,762 B2 |
| APPLICATION NO. | : 11/434860 |
| DATED | : January 8, 2013 |
| INVENTOR(S) | : Willis |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1638 days.

Signed and Sealed this
Second Day of September, 2014

Michelle K. Lee
*Deputy Director of the United States Patent and Trademark Office*